United States Patent Office 3,451,286
Patented June 24, 1969

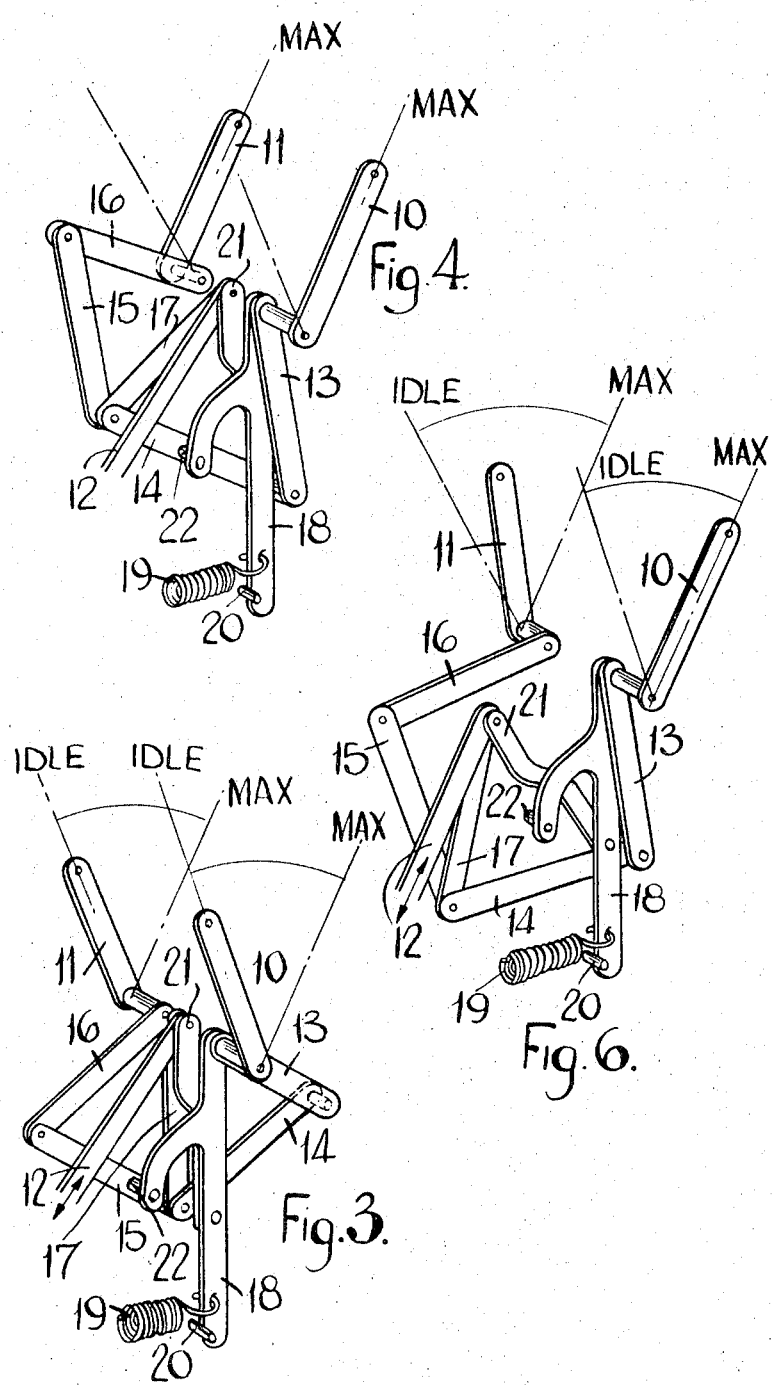

3,451,286
LINKAGES
Joseph Lewis Bloom, Baie D'Urfe, Quebec, Canada, assignor to Joseph Lucas (Industries) Limited, Birmingham, England
Filed Nov. 30, 1967, Ser. No. 687,063
Int. Cl. G05g *13/00*
U.S. Cl. 74—479                                    1 Claim

ABSTRACT OF THE DISCLOSURE

A linkage comprising a first angularly movable input member, an angularly movable output member, a second longitudinally movable input member and a system of interconnected links, connecting the first input member with the output member, the second input member being connected with the links, through a further pair of links and a spring loaded lever, the second input member being capable of occupying a position in which angular movement of the first input member results in corresponding angular movement of the output member, the proportional movement between them depending upon the position of the second input member, and said second input member being capable of occupying a position in which angular movement of the first input member results in no movement of the output member.

---

Figure 1:
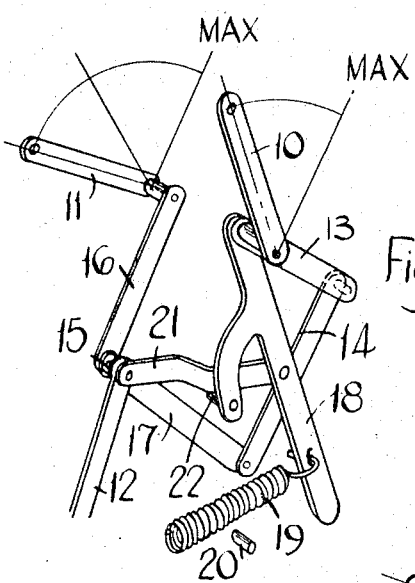

This invention relates to linkages primarily intended for use with fuel control systems for gas turbine engines, the object being to provide such a linkage in a convenient form.

In accordance with the present invention a linkage comprises in combination a first angularly movable input member, pivotally mounted upon a fixed structure, an angularly movable output member pivotally mounted upon the fixed structure about an axis coincident with that of the first input member, a first link connected to the first input member for angular movement therewith, a second link pivotally connected at its free end to the first link, a third link pivotally connected at the opposite end of the second link, and a fourth link connected to the output member for angular movement therewith and pivotally connected to the third link at its free end, the first, second, third and fourth links being of equal length, a second input member movable in the direction of its length, a fifth link pivotally connected at one end to said second input member, the opposite end of the fifth link being pivotally connected at the junction of the second and third links, a lever angularly movable on the fixed structure about an axis coincident with that of the first input member and of the output member, and a sixth link pivotally connected at one end to the lever at a position spaced from its pivot axis, the other end of the sixth link being pivotally connected to the second input member at its junction with the fifth link, the arrangement being such that movement of the first input member through a predetermined angle results in movement of the output member through an angle which is determined by the position of the second input member, the second input member being capable of occupying a position in which the axis connecting it with the fifth link is coincident with the pivotal connection between the third and fourth links and when in this position, the output member remains stationary despite movements of the first input member.

The invention will now be described by way of example with reference to the accompanying drawings in which:
FIGURES 1 to 6 indicate respective positions of a linkage constructed in accordance with the invention.

The linkage illustrated is intended for use in a gas turbine engine fuel system such as that which is disclosed and claimed in the co-pending American patent application No. 686,962, filed November 30, 1967.

The system incorporates a manually operable control connected to a first angularly movable input member 10 of the linkage, and has an emergency throttle device which is connected to an angularly movable output member 11, these being pivotally mounted about coincident axes on a fixed structure (not shown).

The emergency throttle is also used as a change over valve between the main and emergency fuel systems. For this purpose, the emergency throttle has a pair of angularly spaced passages in an angularly movable member. One of the passages serves to permit flow to the main fuel system whilst the other permits flow to the emergency system, the latter flow being determined by the angular position of the member in a body, which thus acts as a throttle, as will be described. However, when the main system is in use, it is not desired to operate this member as a throttle and it must therefore remain stationary despite movements of the first input member of the linkage. The first input member 10 is directly connected for movement in unison with a manual control for a fuel control device in the main system.

This arrangement enables a single manual control to be used either for varying fuel supply, and thus engine speed, for the main or for the emergency system.

The linkage illustrated therefore must be able to occupy a position in which angular movement of the first input member 10 results in no corresponding movement of the output member 11, when the main fuel system is in use, and it must permit a substantial degree of angular movement of the output member 11 during selection of the emergency system, in a manner to be described. After selection of the emergency system, it must permit corresponding movements of the first input 10 and output members 11 in order to affect throttling in the emergency system.

The linkage however has a second input member 12 which is movable in the direction of its length, as will be seen in the drawings. The second input member 12 is connected, in the previously mentioned fuel system, to a piston and cylinder type servo device which is also arranged for selection of the emergency fuel system when required. Normally, that is when the main fuel system is in use, the second input member 12 is held by suitably applied pressures in the servo device, in the position illustrated in FIGURES 1 and 2. If however, the emergency system is selected, the pressures are altered and the servo device becomes sensitive to pressure conditions obtaining in the compressor stage of the associated engine.

The linkage itself comprises a first link 13 connected for angular movement with the first input member 10, the free end of the first link 13 being pivotally connected to a second link 14. This is pivotally connected at its opposite end to a third link 15 the opposite end of which is pivotally connected, in turn, to one end of a fourth link 16 which is connected for angular movement with the output member 11.

The second input member 12 is pivotally connected to a fifth link 17, the opposite end of which is connected at the junction of the second and third links 14, 15.

There is a lever 18 which is pivotally mounted upon the fixed structure about an axis coincident with that of the first input member 10, and also of the output member 11. At a position spaced from said axis there is pivotally connected to the lever 18 a sixth link 21, the opposite end of which is connected at the junction of the second input member 12 and the fifth link 17. The lever 18 has an extension to which a tension spring 19 is connected, there being a stop 20 on the fixed structure and there being a further stop 22 on a lateral extension of the lever 18. The stop 22 projects into the path of travel of the sixth link 21 and the stop 20 is disposed in the path of travel of the extension of the lever 18. The first, second, third, fourth, fifth and sixth links 13 to 17 and 21 are of equal length.

Figure 2:
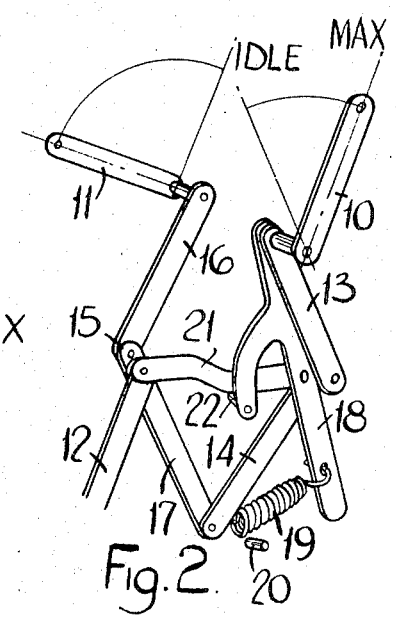

The linkage can occupy a position illustrated in FIGURES 1 and 2, in which the junction of the second input member 12 and the fifth link 17 are coincident with the junction between the third and fourth links 15, 16. In this position, in which the emergency system is out of use, any angular movement of the first input member 11 results in no movement of the fourth link 16, since the links 13, 14, 15 move as a parallel linkage. In this position, it will be seen that the sixth link 21 bears against the stop 22 on the lever 18 causing this to move against its spring 19 away from the stop 20. FIGURE 1 illustrates the position of the first input member 10 corresponding to idling of the associated engine and FIGURE 2 shows the position of that member 10 when the throttle controlled manually in the main fuel system is in its maximum open position.

Figure 5:
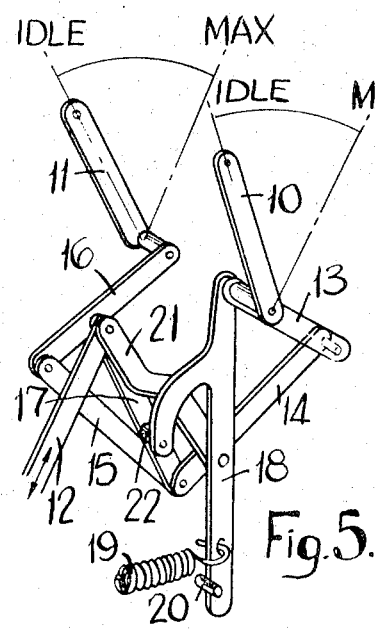

If the emergency system is selected, the second input member 12 will move to take up a position somewhere between that shown in FIGURE 3 and that shown in FIGURE 5, depending upon the engine compressor pressures.

The first part of the travel of the second input member 12 between the position in FIGURE 1 and that in FIGURE 5 will result in 30° of angular movement of the output member 11. This will affect change-over from the main to the emergency system. The remaining 60° of travel of the output member 12 is available for throttling the emergency passage. This first part of the travel will permit the lever 18 to move to its stop 20 as shown in FIGURES 3 to 6.

FIGURES 3 and 4 show the position of the second input member 12 of the linkage when the compressor pressures are at a maximum, FIGURE 3 shows idling conditions and FIGURE 4 shows that corresponding to maximum open position of the throttle. In this position the pivotal connection between the second input member 12 and the fifth and sixth links 17, 21 is coincident with the common axis of the first input member 10 and the output member 11. This will afford equal angular travel of the output member 11 with travel of the first input member 10.

FIGURES 5 and 6, however, illustrate the position of the second input member 12 of the linkage at minimum normally encountered compressor pressures, affording angular travel of the output member 11 corresponding to a proportion of that of the first input member 10. The proportion in this example is 30%.

The system to which this linkage is applied provides varying fueling for the engine with changing altitude, this being reflected in the compressor inlet pressure. There is, in fact, a small change between the idling speed when an aircraft is on the ground and when it is in flight, this being also accommodated by this linkage when the emergency system is in use.

Having thus described my invention what I claim as new and desire to secure by Letters Patent is:

1. A linkage comprising a first angularly movable input member, pivotally mounted upon a fixed structure, an angularly movable output member pivotally mounted upon the fixed structure about an axis coincident with that of the first input member, a first link connected to the first input member for angular movement therewith, a second link pivotally connected at its free end to the first link, a third link pivotally connected at the opposite end of the second link, and a fourth link connected to the output member for angular movement therewith and pivotally connected to the third link at its free end, the first, second, third and fourth links being of equal length, a second input member movable in the direction of its length, a fifth link pivotally connected at one end to said second input member, the opposite end of the fifth link being pivotally connected at the junction of the second and third links, a lever angularly movable on the fixed structure about an axis coincident with that of the first input member and of the output member, and a sixth link pivotally connected at one end to the lever at a position spaced from its pivot axis, the other end of the sixth link being pivotally connected to the second input member at its junction with the fifth link, the arrangement being such that movement of the first input member through a predetermined angle results in movement of the output member through an angle which is determined by the position of the second input member, the second input member being capable of occupying a position in which the axis connecting it with the fifth link is coincident with the pivotal connection between the third and fourth links and when in this position, the output member remains stationary despite movements of the first input member.

References Cited
UNITED STATES PATENTS

| | | | |
|---|---|---|---|
| 2,268,601 | 1/1942 | Knox | 74—479 XR |
| 3,286,958 | 11/1966 | Moran | 74—479 X |

MILTON KAUFMAN, *Primary Examiner.*